US012638833B2

(12) United States Patent
Huang et al.

(10) Patent No.: US 12,638,833 B2
(45) Date of Patent: May 26, 2026

(54) INDUSTRIAL MOVER SYSTEMS AND METHODS

(71) Applicant: Rockwell Automation Technologies, Inc., Mayfield Heights, OH (US)

(72) Inventors: Yuhong Huang, Acton, MA (US); Robert H. Schmidt, Germantown, WI (US); Maria Andrea Ruotolo, Barrie (CA); Alexandra L. Schwertner, Cleveland, OH (US); Patrick Ozimek, Mequon, WI (US); Sinethemba S. Zulu, Johannesburg (ZA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 443 days.

(21) Appl. No.: 18/142,446

(22) Filed: May 2, 2023

(65) Prior Publication Data

US 2024/0369999 A1 Nov. 7, 2024

(51) Int. Cl.
*G05B 19/418* (2006.01)

(52) U.S. Cl.
CPC .................. *G05B 19/41865* (2013.01); *G05B 2219/45054* (2013.01)

(58) Field of Classification Search
None
See application file for complete search history.

(56) References Cited

U.S. PATENT DOCUMENTS

| | | | |
|---|---|---|---|
| 10,345,795 B2 | 7/2019 | Schmidt et al. | |
| 2002/0007867 A1* | 1/2002 | Takada ................. | B65B 65/003 141/2 |

| | | | |
|---|---|---|---|
| 2004/0231288 A1* | 11/2004 | Bernhard ................ | B67C 3/242 53/249 |
| 2005/0034779 A1* | 2/2005 | Bernhard ................ | B67C 3/244 141/144 |
| 2007/0204562 A1* | 9/2007 | Till ....................... | B67C 7/0073 53/167 |
| 2009/0083091 A1* | 3/2009 | Rust ..................... | G06Q 10/063 705/400 |
| 2010/0095734 A1* | 4/2010 | Adams ............... | B21D 51/2692 72/367.1 |
| 2010/0274602 A1* | 10/2010 | Kaufman ........... | G05B 23/0254 705/7.38 |
| 2012/0295358 A1* | 11/2012 | Ariff ...................... | B65G 15/58 422/65 |
| 2015/0159585 A1* | 6/2015 | Kinney .................. | B22D 19/10 123/193.2 |
| 2015/0246777 A1* | 9/2015 | Trebbi .................. | F26B 25/003 414/222.13 |
| 2016/0147242 A1* | 5/2016 | Kaufman .............. | G05B 15/02 700/291 |
| 2016/0207717 A1* | 7/2016 | Senn ...................... | B65G 54/02 |
| 2017/0225590 A1* | 8/2017 | Düvel ................ | B60L 15/2045 |
| 2018/0072552 A1* | 3/2018 | Orndorff .............. | B65G 47/682 |
| 2022/0027529 A1* | 1/2022 | Zarur ..................... | G06F 30/12 |
| 2024/0077838 A1* | 3/2024 | Dolgovykh ........ | G05B 23/0294 |

* cited by examiner

*Primary Examiner* — Jason Lin
(74) *Attorney, Agent, or Firm* — Fletcher Yoder, P.C.

(57) ABSTRACT

A mover system includes a track, a plurality of movers configured to move along the track, and one or more processors. The one or more processors are configured to receive a user input indicative of operational parameters for the mover system, determine operating settings for the mover system based on the operational parameters, and cause the plurality of movers to operate in accordance with the operating settings.

20 Claims, 11 Drawing Sheets

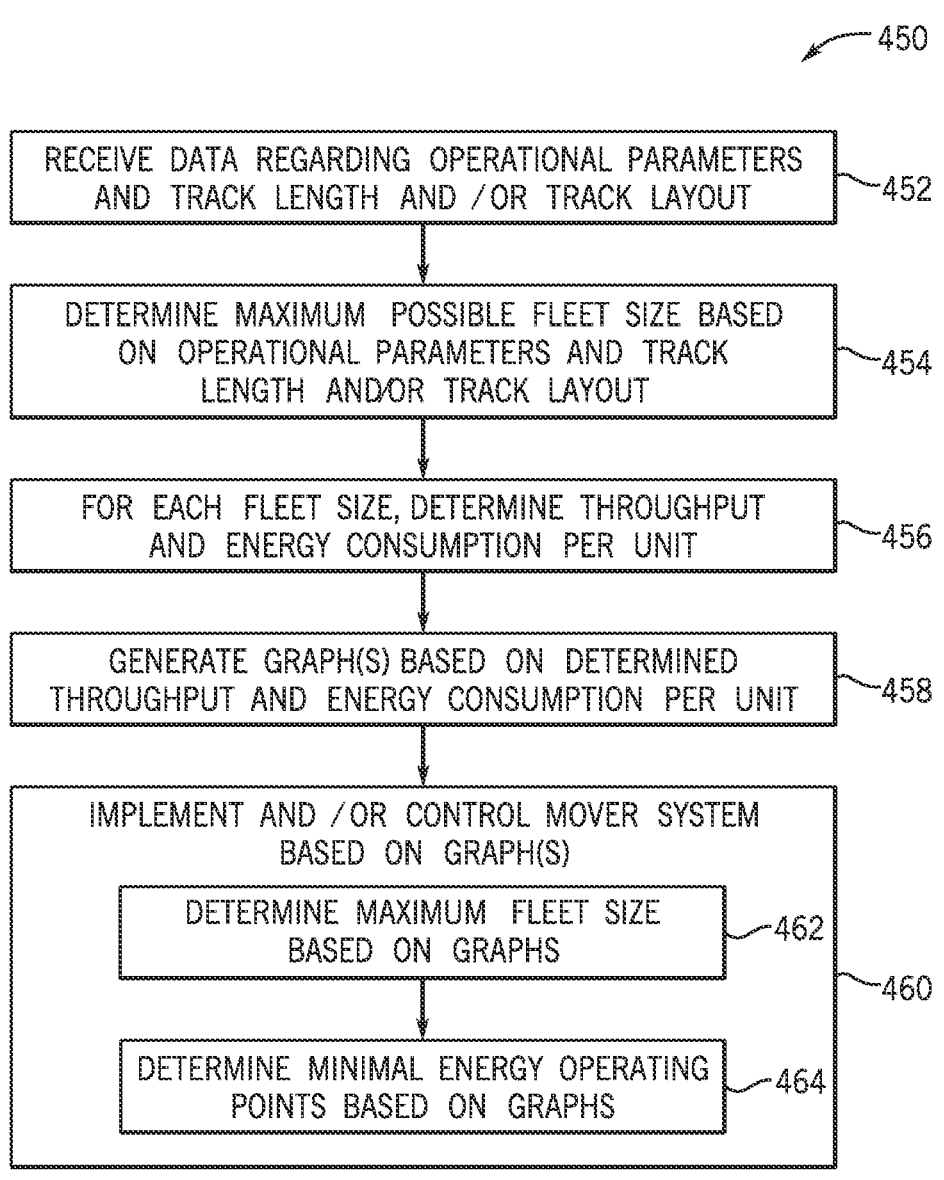

450

RECEIVE DATA REGARDING OPERATIONAL PARAMETERS AND TRACK LENGTH AND /OR TRACK LAYOUT — 452

DETERMINE MAXIMUM POSSIBLE FLEET SIZE BASED ON OPERATIONAL PARAMETERS AND TRACK LENGTH AND/OR TRACK LAYOUT — 454

FOR EACH FLEET SIZE, DETERMINE THROUGHPUT AND ENERGY CONSUMPTION PER UNIT — 456

GENERATE GRAPH(S) BASED ON DETERMINED THROUGHPUT AND ENERGY CONSUMPTION PER UNIT — 458

IMPLEMENT AND /OR CONTROL MOVER SYSTEM BASED ON GRAPH(S)

DETERMINE MAXIMUM FLEET SIZE BASED ON GRAPHS — 462

DETERMINE MINIMAL ENERGY OPERATING POINTS BASED ON GRAPHS — 464

INDUSTRIAL MOVER SYSTEMS AND METHODS

BACKGROUND

The present disclosure generally relates to autonomous movers in industrial automation systems. More particularly, embodiments of the present disclosure are related to systems and methods for designing and controlling mover systems.

Various industries, such as manufacturing, filling, food, beverage, packaging, and material handling applications, may utilize mover systems (e.g., independent cart systems). The mover system may include a track and multiple mover assemblies that may move along the track to transport various objects or products around the track. The mover system may include a control system, which may control the mover assemblies to facilitate performance of an industrial automation process via the mover system. However, the mover system may utilize more than a desired amount of electrical power (which may cause the mover system to have a greater sustainability impact as electrical power consumption is directly related to greenhouse gas emissions), not generate a desired amount of products (or units), or both. Accordingly, improved techniques for designing and controlling mover systems are needed.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a mover system includes a track, a plurality of movers configured to move along the track, and one or more processors. The one or more processors are configured to receive a user input indicative of operational parameters for the mover system, determine operating settings for the mover system based on the operational parameters, and cause the plurality of movers to operate in accordance with the operating settings.

In another embodiment, a non-transitory computer-readable medium includes instructions that, when executed by one or more processors, cause the one or more processors to receive a user input indicative of operational parameters for a mover system that includes a track and a plurality of movers configured to move along the track. The operational parameters include a minimum throughput of the mover system, a maximum throughput of the mover system, a maximum amount of electrical power per unit produced at least partially by the mover system, a maximum cost for electrical power per unit produced at least partially by the mover system, a number of movers of the plurality of movers to be used, or any combination thereof. When executed, the instructions also cause the one or more processors to determine operating settings for the mover system based on the operational parameters and to cause the plurality of movers to operate in accordance with the operating settings.

In a further embodiment, a controller includes one or more processors configured to receive a user input indicative of operational parameters for a mover system. The mover system includes a track and a plurality of movers configured to move along the track. Additionally, the operational parameters include at least two of a minimum throughput of the mover system, a maximum throughput of the mover system, a maximum amount of electrical power per unit produced at least partially by the mover system, a maximum cost for electrical power per unit produced at least partially by the mover system, and a number of movers of the plurality of movers to be used. The one or more processors are also configured to determine operating settings for the mover system based on the operational parameters and to cause the plurality of movers to operate in accordance with the operating settings.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein:

FIG. 6 is a flow diagram of a process for designing and/or controlling a mover system, in accordance with an embodiment;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward designing, implementing, and controlling mover systems. More specifically, as described below, operating settings for a mover system can be determined based on operational parameters that may be selected by a user, and the mover system (and movers in the mover system) may be controlled in accordance with the operating settings. For example, a mover system may be operated in a manner that minimizes an amount of electrical energy consumed (e.g., per part of unit produced using the mover system), minimizes a cost of electrical energy consumed per part of unit produced (or equivalently the overall environmental footprint), maximizes the number of parts or units produced, or a combination thereof. Furthermore, as also discussed below, movers within a mover system may be controlled to be parked, meaning the movers may be moved to an inactive portion of the mover system. Additionally, the number of movers utilized to produce products or units may be modified, for example, by changing the number of movers that are parked. Accordingly, the techniques described herein enable mover systems to operate efficiently and to increase production.

Figure 1:
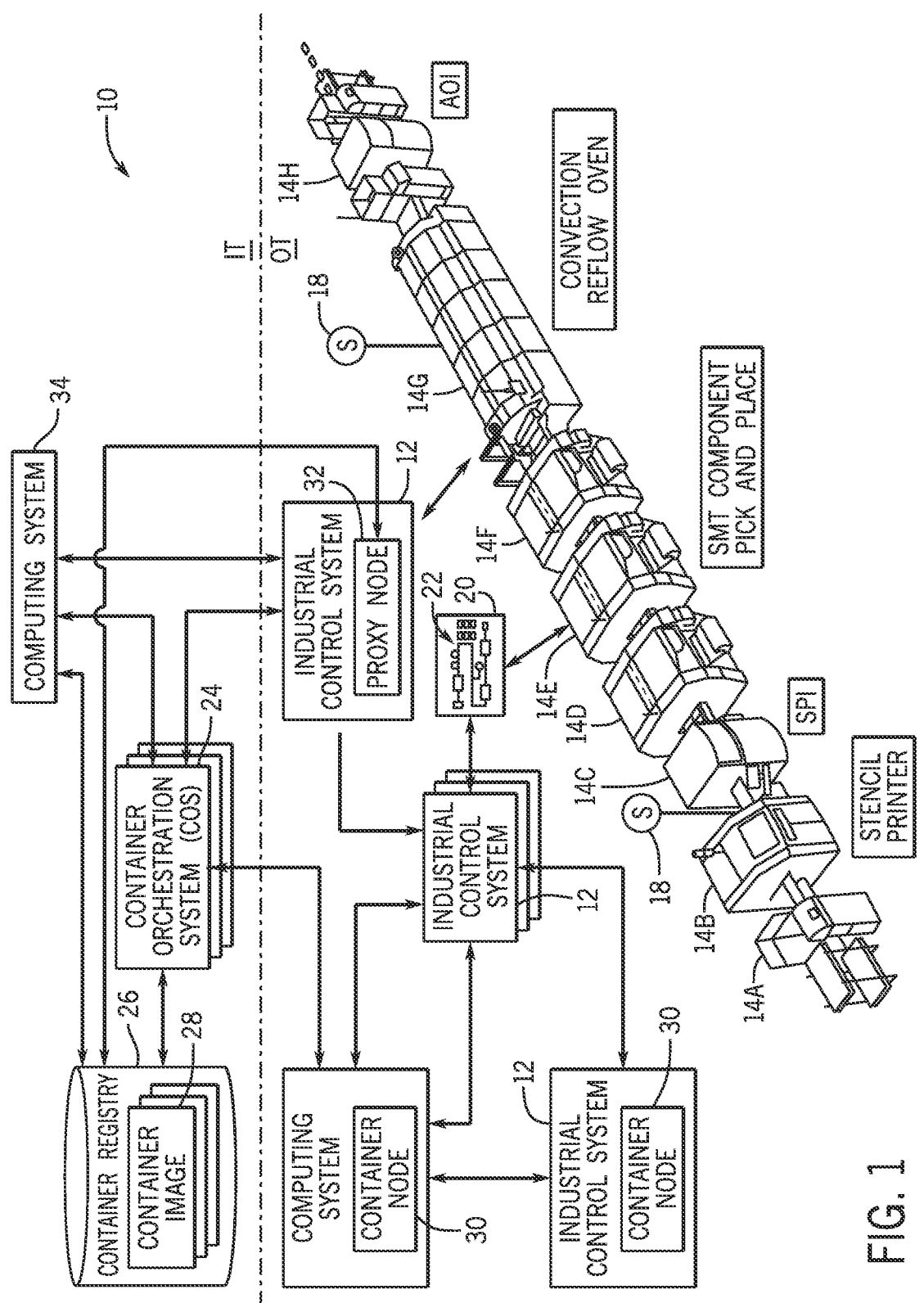
FIG. 1 is a perspective view of an example industrial automation system controlled by an industrial control system, in accordance with an embodiment.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as silicon wafer manufacturing or printed circuit board assembly and/or manufacturing, as is depicted. The automated process may begin at a station 14A used for loading objects, such as substrates, into the industrial automation system 10 via a conveyor section 16. For example, one or more movers, such as independent carts, may transport the objects along the conveyor section 16 that includes a track to a station 14B to perform a first action, such a printing solder paste to the substrate via stenciling. As objects exit from the station 14B, the objects may be transported via the conveyor section 16 to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor, independent cart track segment controllers and/or high-level controllers). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

The industrial automation system 10 may also include a computing system 34, which may be cloud-based. In other words, the computing system 34 may be a cloud-based computing system. In some embodiments, computing system 34 may be a computing device (e.g., a computer, computing system, smart phone, tablet, or other electronic device), and, in some embodiments, the computing system 34 may be accessed via another electronic device (e.g., a computer, computing system, smart phone, tablet, or other electronic device), for example, to enable a user to access data maintained by the computing system 34 or data that is accessible to the computing system 34, such as the container registry 26, data from the container orchestration system 24, or data from the industrial control system 12. As such, a user may be able to (remotely) interact with the container orchestration system 24, the container registry 26, and the industrial automation system 12 via the computing system 34. More specifically, a user may utilize or access the computing system 34 to provide input regarding the operation of the industrial automation system 10 and the industrial control system 12.

Furthermore, the computing system 34 may make determinations regarding the industrial automation system 10, such as the design, operation, and control of one or more mover systems (e.g., independent cart systems) included in the industrial automation system 10. For example, as discussed in more detail below, the computing system 34 may receive user input or other inputs regarding characteristics and/or operational parameters of a mover system and determine, for example, energy usage, output (e.g., a number of components or products built or assembled on the mover system), and operating parameters of the mover system (e.g., a number or range of movers to include in the mover system or a portion thereof, acceleration parameters of the movers, etc.). The computing system 34 may also perform control operations described herein as being performed by the industrial control system 12.

Figure 2:
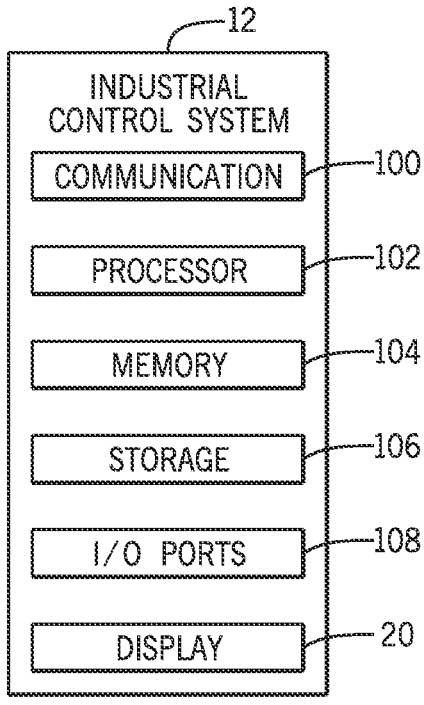
FIG. 2 is a block diagram of an example of the industrial control system of FIG. 1, in accordance with an embodiment.

With the foregoing in mind, FIG. 2 is a block diagram of an example industrial control system 12 that may be used with the embodiments described herein. The industrial control system 12 may include a communication component 100, a processor 102, a memory 104, a storage 106, input/output (I/O) ports 108, a display 20, and the like. Before proceeding to discuss the industrial control system 12 in more detail, it should be noted that the computing system 34 may be implemented in the same manner as the industrial control system 12. As such, the computing system 34 may include the components of the industrial control system illustrated in FIG. 2 and discussed herein.

The communication component 100 may be a wireless or wired communication component that facilitates communication between the container orchestration system 24 and the industrial control system 12, or any other suitable electronic device. The processor 102 may be any type of computer processor or microprocessor capable of executing computer-executable code. The processor 102 may also include multiple processors that may perform the operations described below.

The memory 104 and the storage 106 may be any suitable article of manufacture that may serve as media to store processor-executable code, data, or the like. These articles of manufacture may represent computer-readable media (i.e., any suitable form of memory or storage) that may store the processor-executable code used by the processor 102 to perform the presently disclosed techniques. The memory 104 and the storage 106 may represent non-transitory computer-readable media (e.g., any suitable form of memory or storage) that may store the processor-executable code used by the processor 102 to perform various techniques described herein. It should be noted that non-transitory merely indicates that the media is tangible and not a signal.

The I/O ports 108 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 102. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
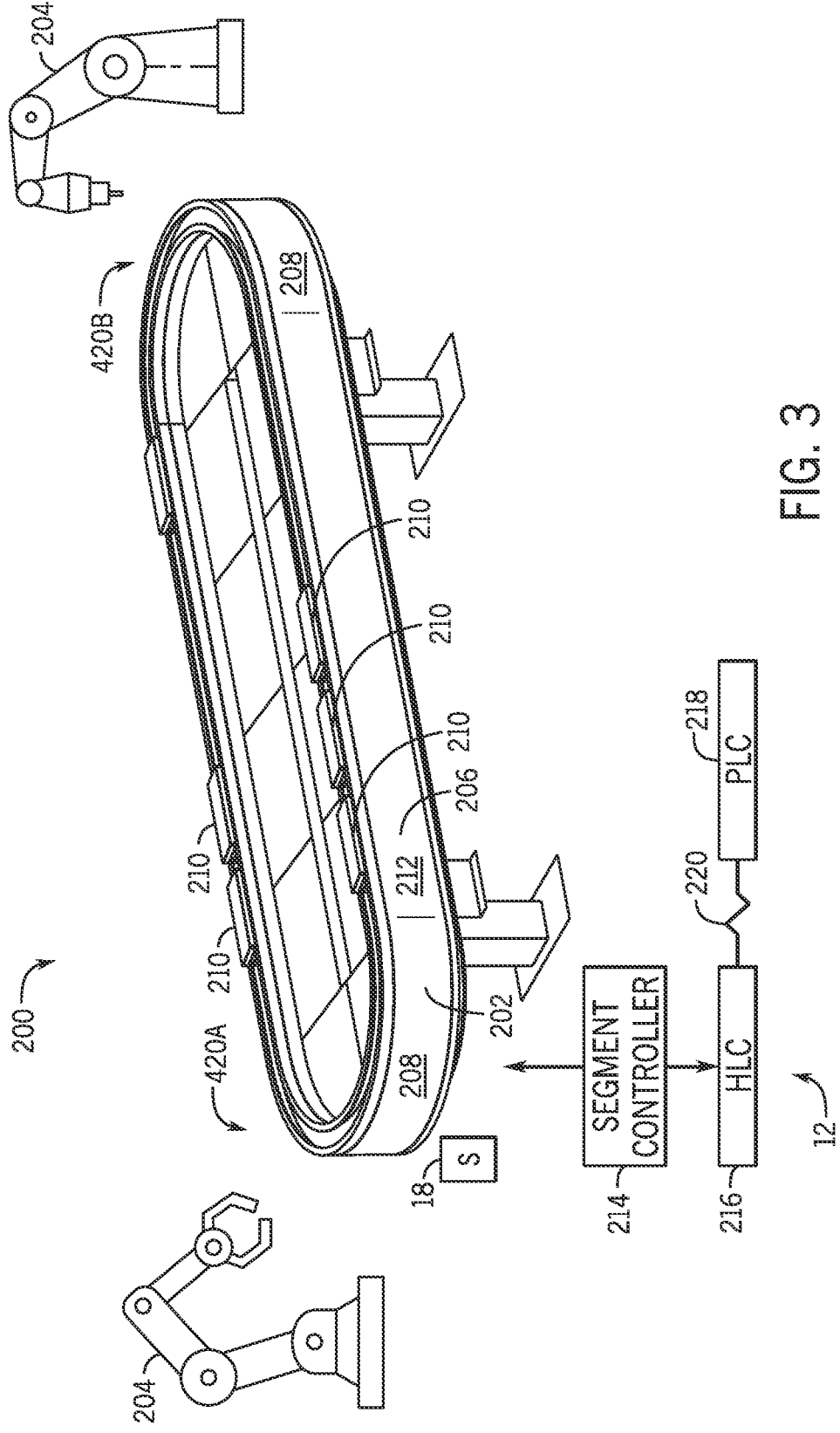
FIG. 3 is a perspective view of an embodiment of a mover system having mover assemblies positioned for movement along a track, which may be utilized in the industrial automation system of FIG. 1, in accordance with an embodiment.

Keeping the foregoing in mind, FIG. 3 is a perspective view of an embodiment of a mover system 200 (e.g., the conveyor section 16 of FIG. 1) that may be employed by the industrial automation system 10 and controlled by the industrial control system 12 to move articles or products around a track 202. As will be appreciated by those skilled in the art, in many applications, the mover system 200 may interoperate with one or more robots 204, machines, conveyers, control equipment, and so forth in an overall automation, packaging, material handling or other application. In the illustrated embodiment, the track 202 includes multiple straight track sections 206 and multiple curved track sections 208. These track sections 206, 208 may be generally self-contained and mountable in various physical configurations, such as in the oval illustrated in FIG. 3. It should be noted that other configurations are also possible as discussed below. The configurations may form closed loops of various shapes but may also include open-ended segments.

The mover system 200 may also include one or more mover assemblies 210, which may be mounted to and movable along the track 202. The position, velocity, acceleration, and/or higher order derivative parameters may be controllable for these mover assemblies 210. The mover assemblies 210 may interact with stationary elements in and around an outer periphery 212 of the track 202, although other configurations are envisaged. Each mover assembly 210 may include a mounting platform. Various tools, holders, support structures, loads, and so forth may be mounted to this mounting platform. The mover assemblies 210 themselves may be configured differently from those shown in order accommodate the various loads. While a horizontal configuration is illustrated in FIG. 3, other orientations may also be provided, such as ones in which the illustrated oval is generally stood on a side or end, or at any angle.

The control system 12 may position, accelerate, decelerate, and generally move the mover assemblies 210 under the influence of controlled magnetic and electromagnetic fields. For example, drive circuitry, such as a segment controller 214 of the control system 12 may provide signals to each track section 206, 208, and specifically to individual coils of the track sections 206, 208, to create electromotive forces that interact with magnets on the track sections 206, 208 to drive the mover assemblies 210 to specific locations and/or at specific velocity, accelerations, and so forth. In some embodiments, the segment controller may regulate motion states, control of movers, and anti-collision of movers. The segment controller 214 may typically include inverter circuitry that makes use of power electronic switches to provide drive power to the individual coils of each section in a controlled manner. In some embodiments, the segment controller 214 may be included in each individual track section 206, 208. Power and control circuitry, such as a high-level controller (HLC) 216 of the control system 12 may provide signals (e.g., move commands and/or various control signals) to the segment controller 214. A control/monitoring device, such as a PLC 218 may be linked to the mover system 200 by one or more networks 220. During operation, the PLC 218 may allow for coordination of the operation of the mover system 200 with other automation components, machine systems, manufacturing and material handling machines, and so forth. For example, the PLC 218 may receive data from the sensors 18 to detect various features, such as the location, position, orientation, velocity, acceleration, and so forth, of each individual mover assembly 210 and output control signals to the HLC 216 to control operation of the segment controller 214 to move the mover assemblies 210.

In certain embodiments, the PLC 218 may independently control each mover assembly 210. That is, the PLC 218 may regulate the position, velocity, and/or acceleration of each mover assembly 210 to move objects to intended locations while avoiding conflicts, collisions, and so forth. For example, the PLC 218 may cause the segment controller 214 to provide power to different coils of the track sections 206, 208 independently of one another (e.g., to control the coils that are energized and de-energized) to drive movement of the mover assemblies 210 separately from one another. The particular motion profile implemented by the HLC 216 may typically be implemented upon the design and commissioning of the mover system 200, depending upon the particular task to be performed. However, it should be understood that embodiments are envisaged in which the various tasks associated with controlling the mover assemblies 210 may be performed entirely by the segment controller 214, the HLC 216, and/or the PLC 218, or the tasks may be differently distributed among some combination of the segment controller 214, the HLC 216, and the PLC 218.

Figure 4:
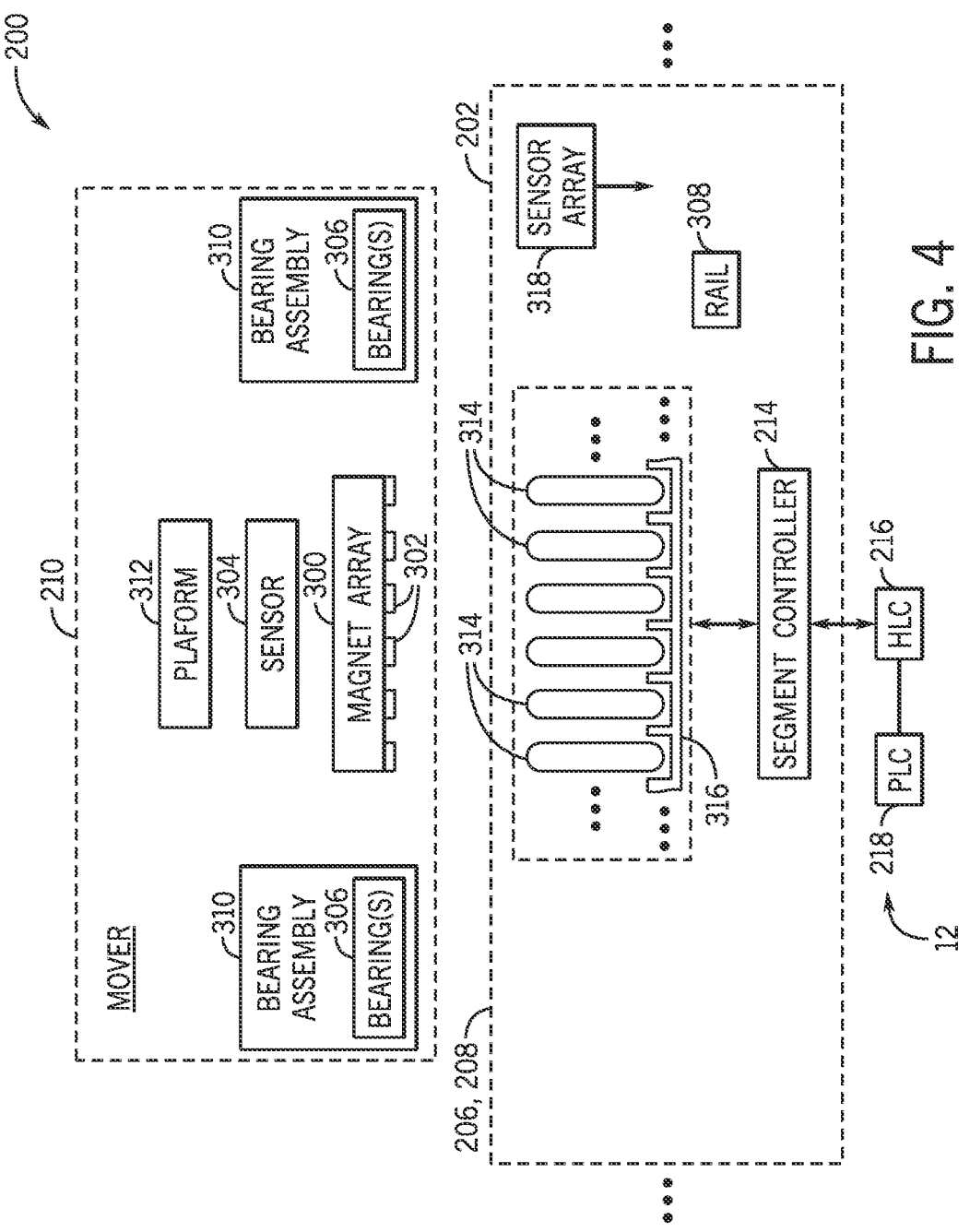
FIG. 4 is a schematic diagram of an embodiment of the mover assembly of the mover system of FIG. 3, in accordance with an embodiment.

FIG. 4 is a schematic diagram of an embodiment of the mover system 200 showing one track section 206, 208 and one mover assembly 210 positioned along the track 202. The track 202 illustrated in FIG. 4 may be the straight track section 206 or the curved track section 208, these two differing in their physical configuration. Each mover assembly 210 may include a magnet array 300 on which a number of magnets 302 may be mounted. The magnets 302 may be permanent magnets mounted such that a small air gap is provided between the coils of the track 202 while the mover assembly 210 is mounted to the track 202. The mover assembly 210 may also include a sensor 304 (e.g., the sensor 18) that may monitor various operations associated with the mover assembly 210. For example, the sensor 304 may include a position sensor, an accelerometer, an inertial measurement unit, a distance sensor, a force sensor, and the like that may monitor a position, velocity, acceleration, load, and so forth of the mover assembly 210. The sensor 304 may additionally include a single axis or multiple axes sensor that may monitor vibration of the mover assembly 210 in different axes. The mover assembly 210 may also include bearings 306 and associated components (e.g., rollers) that may interact with rails 308 of the track 202. The bearings 306 and rails 308 may allow the mover assembly 210 to remain securely attached to the track 202 while allowing relatively free movement of the mover assemblies 210 along the track 202 and supporting mechanical loads and forces encountered during motion. Each mover assembly 210 may include any number of bearing assemblies 310 to couple the bearings 306 to a housing of the mover assembly 210. Each mover assembly 210 may further include a respective platform 312 that may support an object for transportation while the mover assemblies 210 move along the track 202.

The track 202 may include a series of parallel coils 314 that are associated with a stator or armature 316. In currently contemplated embodiments, these coils 314 may be mounted into slots in the stator 316, and the stator 316 itself may be made of magnetic material formed into a stack of laminates and structured to allow for mounting within a housing of the track 202. The segment controller 214 may be included in each track section 206, 208 to allow for controlled power signals to be applied to the coils 314 in order to drive and position the mover assemblies 210 appropriately around the track 202. A sensor array 318 (e.g., including the sensor 18) is provided in each track section 206, 208. The sensor array 318 may provide feedback that can indicate the position of the mover assemblies 210 and can be used to derive velocity, acceleration, jerk, and other motion parameters. As an example, the sensor array 318 may include a vibration sensor secured to (e.g., at an underside of) the rail 308 to monitor vibration caused by movement of the mover assemblies 210 along the rail 308. In the illustrated embodiment, a number of track sections 206, 208 may be mounted end-to-end and interconnected with one another and/or with the HLC 216 to receive signals used to power the coils 314.

As will be appreciated by those skilled in the art, multiple track sections 206, 208, along with the magnet arrays 300 of the mover assemblies 210, may generally form the mover system 200. That is, electromotive force is generated by the controlled fields of the coils 314, and interaction between these fields and the magnetic fields of the magnet array 300 serve to drive the mover assembly 210 into desired positions, at desired speeds, and so forth. The coils 314 may be designed in accordance with various configuration strategies, such as ones having the coils 314 arranged around a periphery of the track 202, ones in which the coils 314 are generally planar (in a top or bottom position of the track 202), and so forth. The segment controller 214, the HLC 216, the PLC 218, or some combination of the controllers may selectively (e.g., independently) cause different coils 314 of different track sections 206, 208 to energize to drive independent movement of the mover assemblies 210, such as to drive a first mover assembly 210 to move at a first speed along a first track section 206, 208 and to drive a second mover assembly 210 to move at a second speed along a second track section 206, 208.

The PLC 218 may receive sensor data and analyze the data to determine whether the mover system 200 is operating as desired. For example, the PLC 218 may compare received sensor data with expected sensor data. Further, the PLC may be configured to use sensor data to calculate performance metrics and then compare the calculated performance metrics to expected/benchmark performance metric values, and/or plot calculated performance metrics over time and identify throughput degradation. A deviation between the received sensor data and the expected sensor data, or identified performance degradation, may indicate a deviation from an expected operation (e.g., an identified unexpected operation, an identified anomalous condition, or a discrepancy between an operational state and an expected operation state) of the mover system 200. The comparison between the received sensor data and the expected sensor data may be used to identify devices or machines that are operating in an expected or an unexpected manner. For example, the PLC 218 may identify devices, equipment, and/or machines for which maintenance or modifying operation may be appropriate based on the received sensor data.

Though embodiments shown and described with regard to FIGS. 3 and 4 correspond to independent cart technology (ICT) mover assemblies 210 in which the mover assembly is a passive component driven and actuated by the track 202, it should be understood that the present techniques are not intended to be limited to such embodiments and that the disclosed techniques may be similarly applied to other types of autonomous vehicle systems, such as autonomous mobile robots (AMRs), autonomous guided vehicles (AGVs), hybrid-electric vehicles, unmanned aerial vehicles (UAVs), and so forth, which may or may not move along a track. Moreover, in embodiments in which the present techniques are utilized with autonomous vehicle systems other than ICT mover assemblies (e.g., AMRs, AGVs, UAVs), the track 202 may be defined by routes between areas. For example, in the context of a warehouse, the track 202 may be defined by areas or routes between shelves that a mover or robot may move in or along. As such, the track 202 may be defined by long lines or wires on the floor or by areas that a mover (e.g., mobile robot) may navigate using radio waves, vision cameras, magnets, or lasers.

Figure 5:
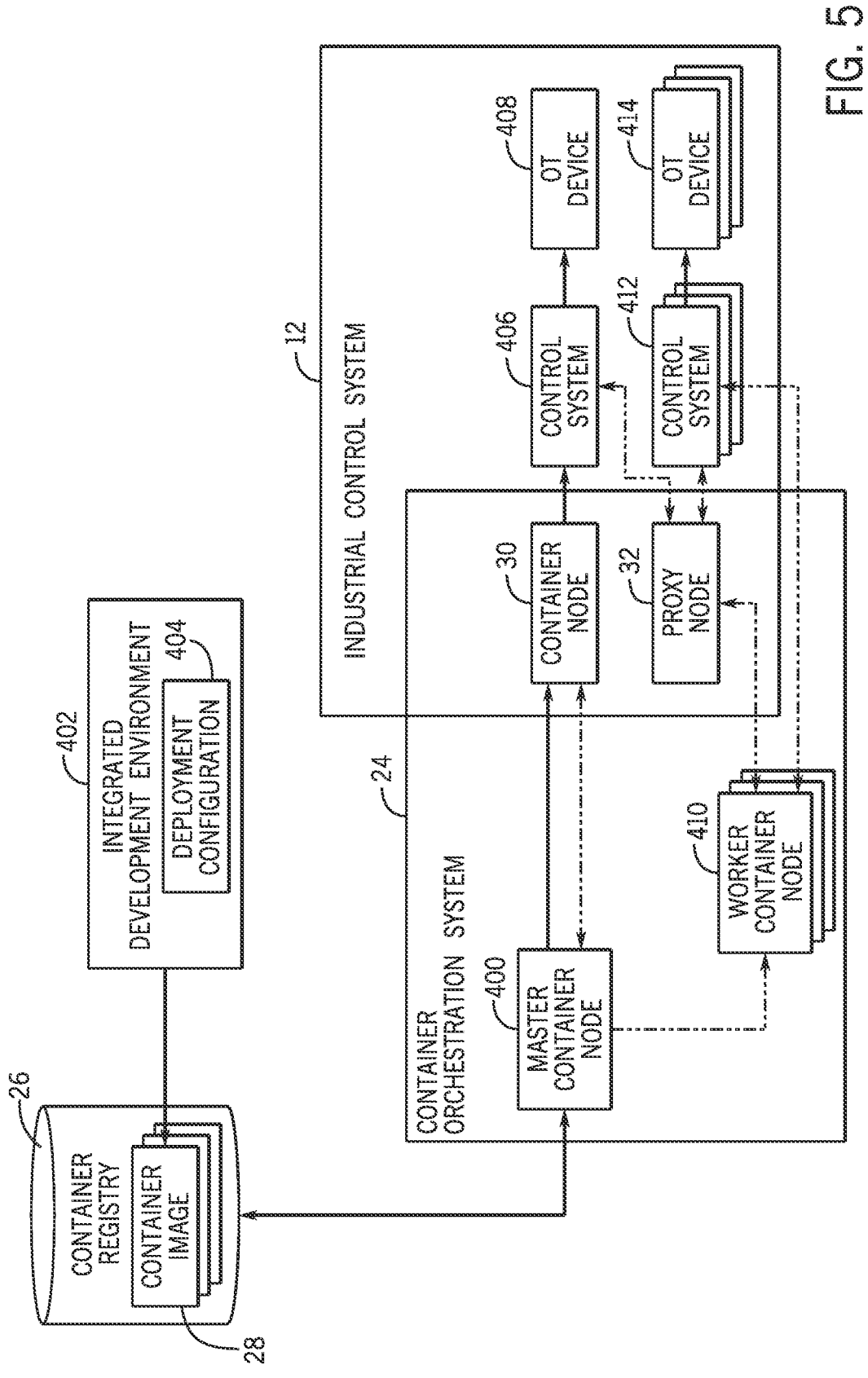
FIG. 5 is a block diagram of an example operational technology (OT) network that coordinates with a container orchestration system, in accordance with an embodiment.

In some embodiments, when a performance deviation or throughput degradation is detected, one or more containers may be deployed to collect data, analyze the collected data, and/or diagnose one or more conditions that may be contributing to the performance deviation or throughput degradation. With the foregoing in mind, FIG. 5 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 5, the container orchestration system 24 may include a master node 400 that may execute control plane processes for the container orchestration system 24. The control plane processes may include the processes that enable the container orchestration system 24 to coordinate operations of the container nodes 30 to meet the desired states. As such, the master container node 400 may execute an applications programming interface (API) for the container orchestration system 24, a scheduler component, core resource controllers, and the like. By way of example, the master container node 400 may coordinate all of the interactions between nodes of the cluster that make up the container orchestration system 24. Indeed, the master container node 400 may be responsible for deciding the operations that will run on container nodes 30 including scheduling workloads (e.g., containerized applications), managing the workloads' lifecycle, scaling, and upgrades, managing network and storage resources for the workloads, and the like. The master container node 400 may run an API server to handle requests and status updates received from the container nodes 30.

By way of operation, an integrated development environment (IDE) tool 402 may be used by an operator to develop a deployment configuration file 404. As mentioned above, the deployment configuration file 404 may include details regarding the containers, the pods, constraints for operating the containers/pods, and other information that describe a desired state of the containers specified in the deployment configuration file 404. In some embodiments, the deployment configuration file 404 may be generated in a YAML file, a JSON file, or other suitable file format that is compatible with the container orchestration system 24. After the IDE tool 402 generates the deployment configuration file 404, the IDE tool 402 may transmit the deployment configuration file 404 to the container registry 26, which may store the file along with container images 28 representative of the containers stored in the deployment configuration file 404.

In some embodiments, the master container node 400 may receive the deployment configuration file 404 via the container registry 26, directly from the IDE tool 402, or the like. The master container node 400 may use the deployment configuration file 404 to determine a location to gather the container images 28, determine communication protocols to use to establish networking between container nodes 30, determine locations for mounting storage volumes, locations to store logs for the containers, and the like.

Based on the desired state provided in the deployment configuration file 404, the master container node 400 may deploy containers to the container host nodes 30. That is, the master container node 400 may schedule the deployment of a container based on constraints (e.g., CPU or memory availability) provided in the deployment configuration file 404. After the containers are operating on the container nodes 30, the master container node 400 may manage the lifecycle of the containers to ensure that the containers specified by the deployment configuration file 404 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX. EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a PLC that cannot support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the master container node 400 into actions that may be performed by the PLC. After converting the received command into a command interpretable by the PLC, the container node 30 may forward the mapped command to the PLC that may implement command. As such, the container node 30 may operate as part of the cluster of nodes that make up the container orchestration system 24, while a control system 406 (e.g., PLC) that coordinates the OT operations for an OT device 414 in the industrial control system 12. The control system 406 may include a controller, such as a PLC, an HLC, a programmable automation controller (PAC), or any other controller that may monitor, control, and operate an industrial automation device or component.

The industrial automation device or component may correspond to an OT device 408. The OT device 408 may include any suitable industrial device that operates in the OT space. As such, the OT device 408 may be involved in adjusting physical processes being implemented via the industrial system 10. In some embodiments, the OT device 408 may include motor control centers, motors, HMIs, operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 408 may also be related to various industrial equipment such as mixers, machine conveyors, tanks, skids, specialized original equipment manufacturer machines, and the like. The OT device 408 may also be associated with devices used by the equipment such as scanners, gauges, valves, flow meters, and the like. In one embodiment, every aspect of the OT device 408 may be controlled or operated by the control system 412.

In the present embodiments described herein, the control system 406 may thus perform actions based on commands received from the container node 30. By mapping certain container lifecycle states into appropriate corresponding actions implementable by the control system 406, the container node 30 enables program content for the industrial control system 12 to be containerized, published to certain registries, and deployed using the master container node 400, thereby bridging the gap between the IT-based container orchestration system 24 and the OT-based industrial control system 12.

In some embodiments, the container node 30 may operate in an active mode, such that the container node may invoke container orchestration commands for other container nodes 30. For example, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 406 that is configured (e.g., partitioned), such that the control system 406 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 408 based on IT data. For instance, the proxy node 32 may acquire OT device tree data, state data for an OT device, descriptive metadata associated with corresponding OT data, versioning data for OT devices 408, certificate/key data for the OT device, and other relevant OT data via OT communication protocols. The proxy node 32 may then translate the OT data into IT data that may be formatted to enable the master container node 400 to extract relevant data (e.g., machine state data) to perform analysis operations and to ensure that the container orchestration system 24 and the connected control systems 406 are operating at the desired state. Based on the results of its scheduling operations, the master container node 400 may issue supervisory control commands to targeted OT devices via the proxy nodes 32, which may translate and forward the translated commands to the respective control system 406 via the appropriate OT communication protocol.

In addition, the proxy node 32 may also perform certain supervisory operations based on its analysis of the machine state data of the respective control system 406. As a result of its analysis, the proxy node 32 may issue commands and/or pods to other nodes that are part of the container orchestration system 24. For example, the proxy node 32 may send instructions or pods to other worker container nodes 410 that may be part of the container orchestration system 24. The worker container nodes 410 may corresponds to other container nodes 30 that are communicatively coupled to other control systems 412 for controlling other OT devices 414. In this way, the proxy node 32 may translate or forward commands directly to other control systems 412 via certain OT communication protocols or indirectly via the other worker container nodes 410 associated with the other control systems 412. In addition, the proxy node 32 may receive replies from the control systems 412 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 414 in a coordinated fashion. That is, the proxy node 32 may enable the container orchestration system to coordinate the activities of multiple control systems 406 and 412 to achieve a collection of desired machine states for the connected OT devices 408 and 414.

Returning briefly to FIG. 3, mover assemblies 210 may be controlled to move around the track 202, progressing through a sequence of stations 420 at which one or more robots 204 perform one or more operations on the load being carried by the respective mover assembly. For example, a robot 204 at a particular station 420 (referring collectively to stations 420A, 420B) may be configured to fill a bottle with product, seal a vessel, apply a fastener, install a part, perform an inspection, count items, pick up an item, deposit an item, or perform some other operation. For instance, a robot 204 may performs an operation on a load carried by the mover assembly 210 while the mover assembly 210 is stationary at a first station 420A. The load may include a piece of product, such as a part, a molded/extruded object, a widget, etc., a vessel that holds product, such as a can, a bottle, a tub, a bag, a tube, etc., or some other item. A signal may be generated when the robot 204 completes the process. The signal may be generated by the robot 204 itself, the PLC 218, the HLC 216, or some other device. When the signal indicating that the robot 204 has completed the process has been received by the PLC 218, the HLC 216, and/or the segment controller 214, or a set amount of time has elapsed, the segment controller 214 may actuate the mover assembly 210 to depart the first station 420A and travel along the track 202 toward a second station 420B. The time elapsed between the mover assembly 210 leaving the first station 420A and arriving at the second station 420B may be referred to as the transit time. After the mover assembly 210 arrives at the second station 420B and stops moving along the track 202, the mover system 200 may pause while the load settles. This period of time may be referred to as settling time. For example, if the load includes a vessel carrying an amount of liquid, or some other item that may move while the mover assembly 210 is in motion, it may take a period of time for the load to stop moving even after the mover assembly 210 has come to a stop. In some embodiments, the segment controller 214 and/or the mover assembly 210 may generate and transmit a vehicle report with various information, such as data identifying the mover assembly 210, data identifying the load, data associated with the movement of the mover assembly, and so forth. After the load has settled, time may pass while the robot 204 prepares to perform the process on the load. This period of time may be referred to as the robot preparation time. After the robot 204 preparation, the robot 204 performs the process. The time that passes while the robot 204 performs the process may be referred to as the robot processing time. When the robot 204 has completed the process, a signal may be generated that the process has been completed, or it may be assumed that the process has been completed after a set period of time has elapsed. The segment controller 214 may then actuate the mover assembly 210 to depart the second station 420B for a subsequent station.

One or more sensors 18, 304, 318 may be disposed throughout the mover system 200 and collect data from mover assemblies 210 moving along the track 202. As shown, some sensors 304 may be mounted to or incorporated within mover assemblies 210 and collect data from the respective mover assembly as it moves along the track 202. Other sensors 318 may be mounted to or incorporated within track sections 206, 208 and collect data as mover assemblies 210 travel along the track 202 past the sensors 318. Further, sensors 18 may otherwise be disposed throughout the mover system 200, either in a stationary fashion or a mobile fashion, and configured to sense various aspects of mover assemblies 210 moving around the track 202. In some embodiments, the sensors 18, 304, 318 may be dual process sensors that are also used in providing feedback control of mover assemblies 210, robots 204, or other components of the industrial automation system. Accordingly, such sensors collect data associated with mover assemblies 210 that pass within a sensing proximity of the sensors 18. The various sensors 18, 304, 318 may continuously or periodically transmit collected data to a data collection component, such as a container, an edge device, a compute surface of an automation device, an HLC 216, a PLC 218, a cloud computing device, etc. In some embodiments, data may be received and transmitted by a chain of components until the data is received by the PLC 218.

Figure 10:
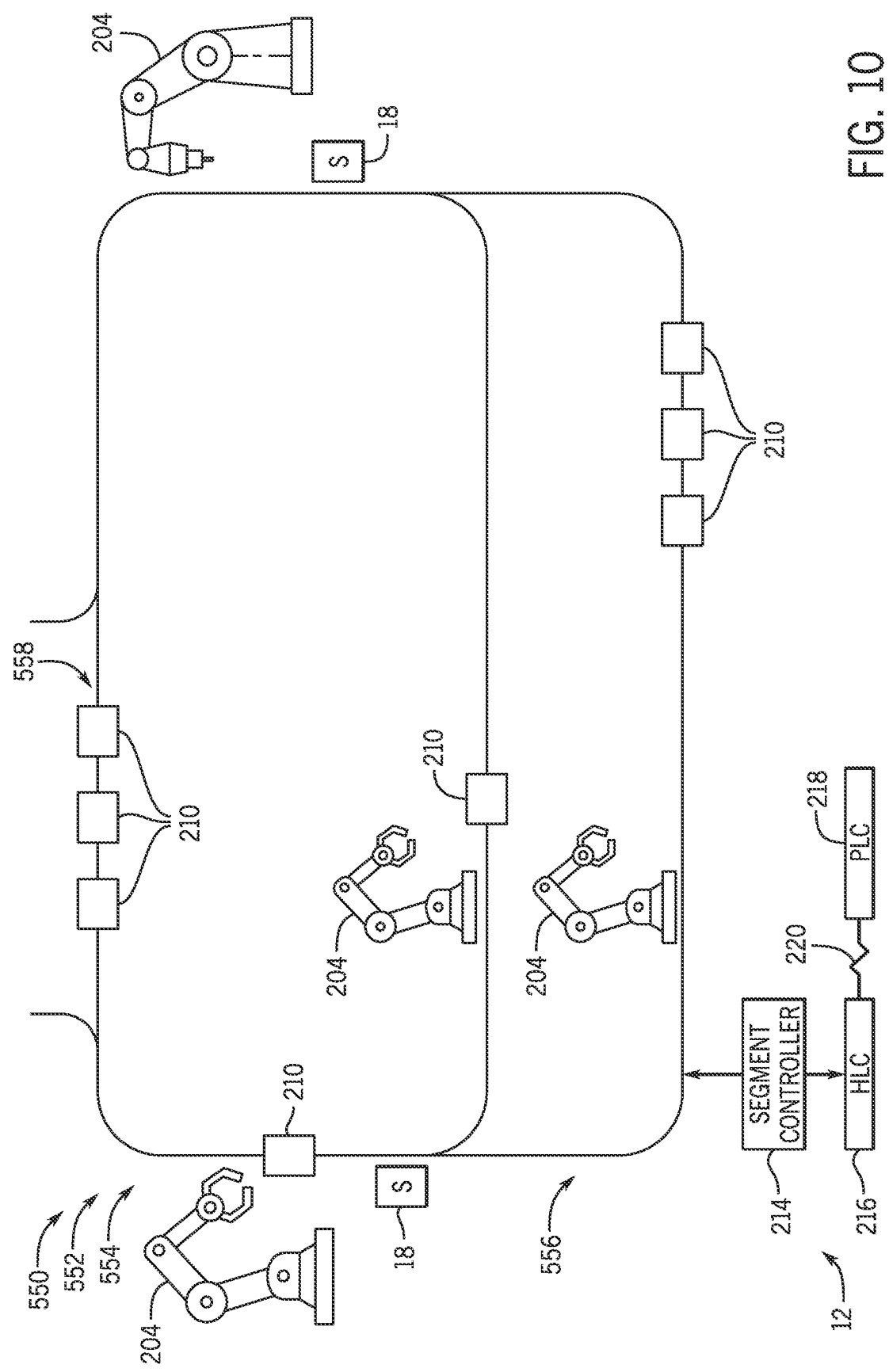
FIG. 10 is a schematic drawing of a mover system that includes a parking lot, in accordance with an embodiment.

Bearing the foregoing in mind, FIG. 6 is a flow diagram of a process 450 for designing and/or controlling a mover system, such as the mover system 200 or any other mover system, including the mover system discussed below with respect to FIG. 10. The process 450 may be performed by the industrial control system 12 or a computing device or system included in the industrial automation system 10, such as, but not limited to, the computing system 34. The process 450 may be implemented by one or more processors executing computer-readable instructions that may be stored on the non-transitory storage medium. Furthermore, the process 450 may be implemented via processing circuitry that implements one or more containers (e.g., a container utilized by the industrial control system 12 or the container orchestration system 24). As such, while the process 450 is generally described below with reference to the computing system 34 and the mover system 200, it should be noted that the process 450 may be performed by other another device or system. Furthermore, it should be noted that, in some embodiments, operations of the process 450 described below may be omitted or performed in a different order than as discussed below. The process 450 generally includes receiving data regarding operational parameters and track length and/or track layout of a mover system 200 (process block 452), determining a maximum possible fleet size based on operational parameters and track length and/or track layout (process block 454), determining throughput and energy consumption per unit produced for each fleet size (process block 456), generating graph(s) based on determined throughput and energy consumption per unit (process block 458), and implementing and/or controlling the mover system based on the graphs (process block 460). Implementing and/or controlling the mover system may include determining a maximum fleet size (sub-process block 462) and determining one or more minimal energy operating points (sub-process block 464).

At process block 452, the computing system 34 may receiving data regarding operational parameters, track length, a track layout of a mover system, or any combination thereof. Operational parameters may include, but are not limited to, costs of energy (e.g., electrical power in megawatts per hour) at different times, one or more target throughputs (e.g., amounts of units to be produced or generated using the mover system), motion parameters associated with movers (e.g., maximum acceleration, maximum velocity, braking characteristics, etc.), a size or sizes of the movers, dwell times for particular stations, settling times, carbon impact associated with electrical energy consumption (e.g., based on energy source being renewable or non-renewable and/or time of day at which energy sources are available), overall environmental impact associated with electrical energy consumption (which may include the carbon impact), or any combination thereof. The track layout may be a mapping of a mover system that may be indicative of the layout of the mover system, the location(s) of station (s) within the mover system, the location(s) of robot(s) or other automation devices in the mover system, or any combination thereof. Furthermore, the track length may be a distance of track included in the mover system as well as distances of portions of the track (e.g., a distance from one station to a next station within the mover system). The data the computing system 34 receives at process block 452 may be received via a user input or accessed from a data repository (e.g. on memory or storage of the computing system 34 or communicatively coupled to the computing system 34) or via an Internet search.

At process block 454, the computing system 34 may determine a maximum possible fleet size based the data received at process block 452. The maximum possible fleet size may be a value that is equal to the highest possible number of movers that will fit onto the track of a mover system (e.g., based on the track length and the size(s) of the mover(s)). In one embodiment, the maximum possible fleet size may be determined based solely on the track layout, the length of track, or both. Additionally, the maximum possible fleet size may be determined based on simulations performed by the computing system 34. For example, the computing system 34 may generate and/or implement digital twins of the mover system and perform simulations (based on the data received at process block 452) using the digital twins to determine a maximum number of movers that may be included in the mover system. Furthermore, the maximum number of movers may be determined (e.g., in existing mover systems) by physically placing movers (e.g. mover assemblies 210) within the mover system (e.g., on the track 202). While discussed below, the maximum number of movers may also include movers that may be stationary (e.g., in a "parking lot") during operation of the mover system.

At process block 456, the computing system 34 may determine throughput (e.g., units or parts produced in a particular time period, such as a minute) and energy consumption per unit produced for fleet sizes that may be implemented in the mover system. The fleet sizes may include any number of movers that is equal to or less than the maximum possible fleet size determined at process block 454. Similar to process block 454, the computing system 34 may determine the throughputs and energy consumptions by performing simulations of the mover system. In other embodiments, the throughputs and energy consumptions may be determined partially or entirely based on data collected during operation of the mover system (or in combination with simulations). In other embodiments. (e.g., in existing mover systems), the throughputs and energy consumptions may be actual throughputs and energy consumptions of a mover system. For example, the mover system may be controlled to operate using several different operating conditions (e.g., number of movers, acceleration and/or braking parameters of movers, etc.), and the throughputs and energy consumptions may be measured. It should be noted that the energy consumptions may be specific to the mover system. That is, the energy consumptions may be amounts of electrical power utilized by the mover system to perform an entire production of a unit (e.g., an item produced) or a portion of the entire production of a unit. In embodiments in which the mover system is utilized to perform a (less than entire) portion of the production of a unit, the energy consumptions may be amounts of power associated with the entire production of the unit. As such, the energy consumptions or values reflecting amounts of energy consumed (e.g., per part or unit produced), may be indicative of electrical power utilized by the mover system and other components (e.g., of the industrial automation system) not included in the mover system.

Figure 7:
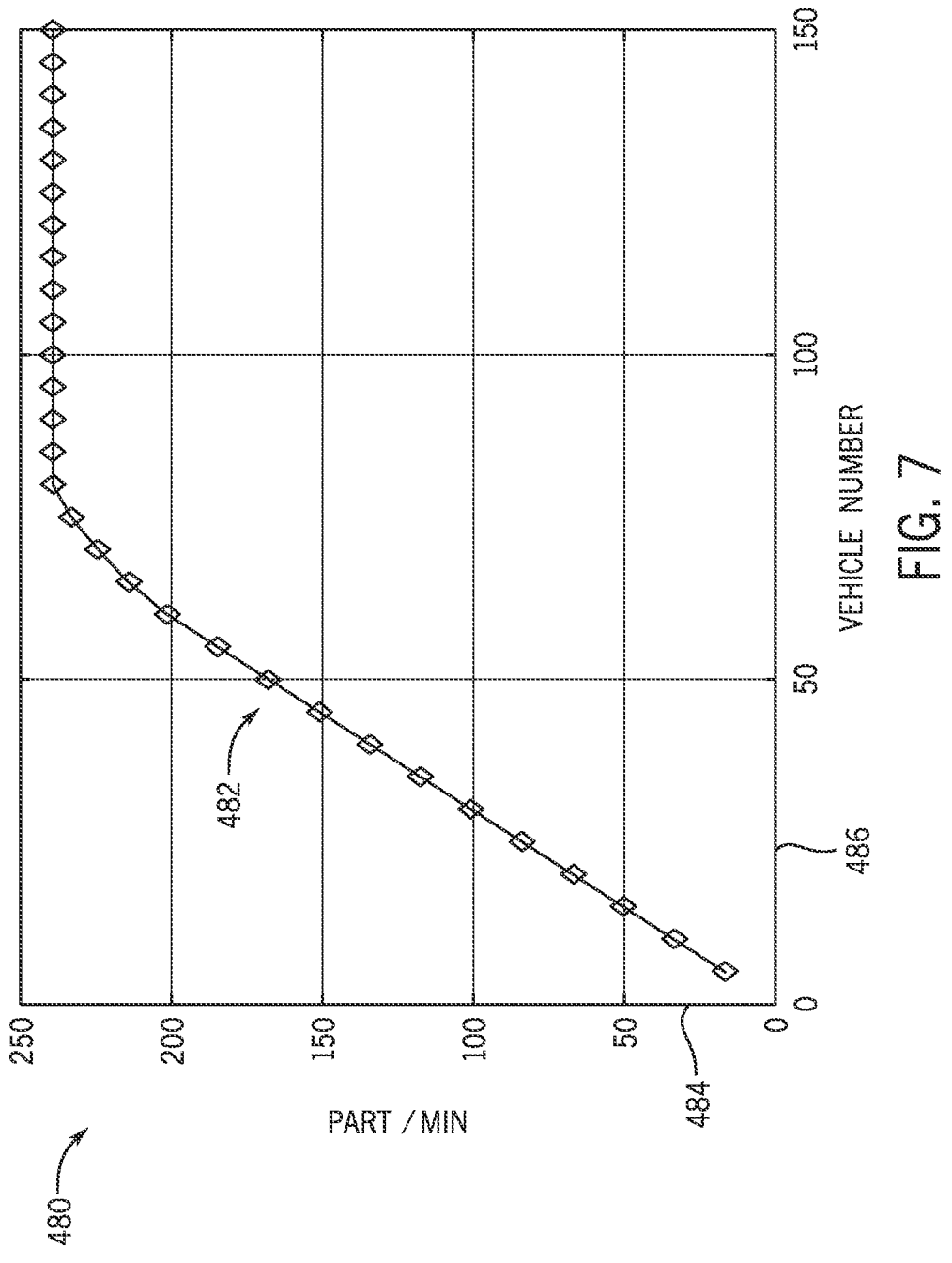
FIG. 7 is a graph indicative of a number of parts produced by a mover system per minute per number of movers in the mover system, in accordance with an embodiment.
Figure 8:
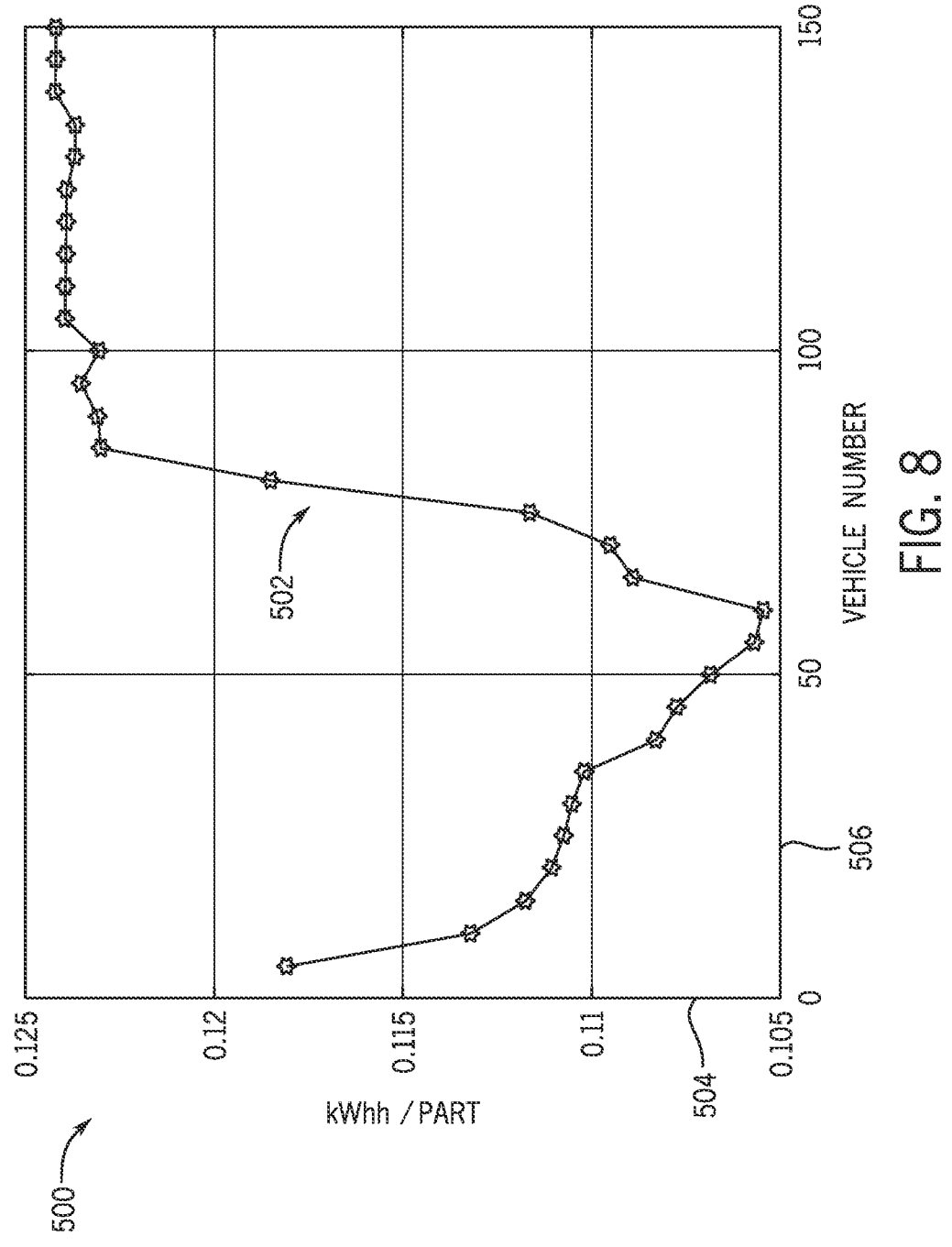
FIG. 8 is a graph indicative of energy consumption per number of movers in a mover system, in accordance with an embodiment.
Figure 9:
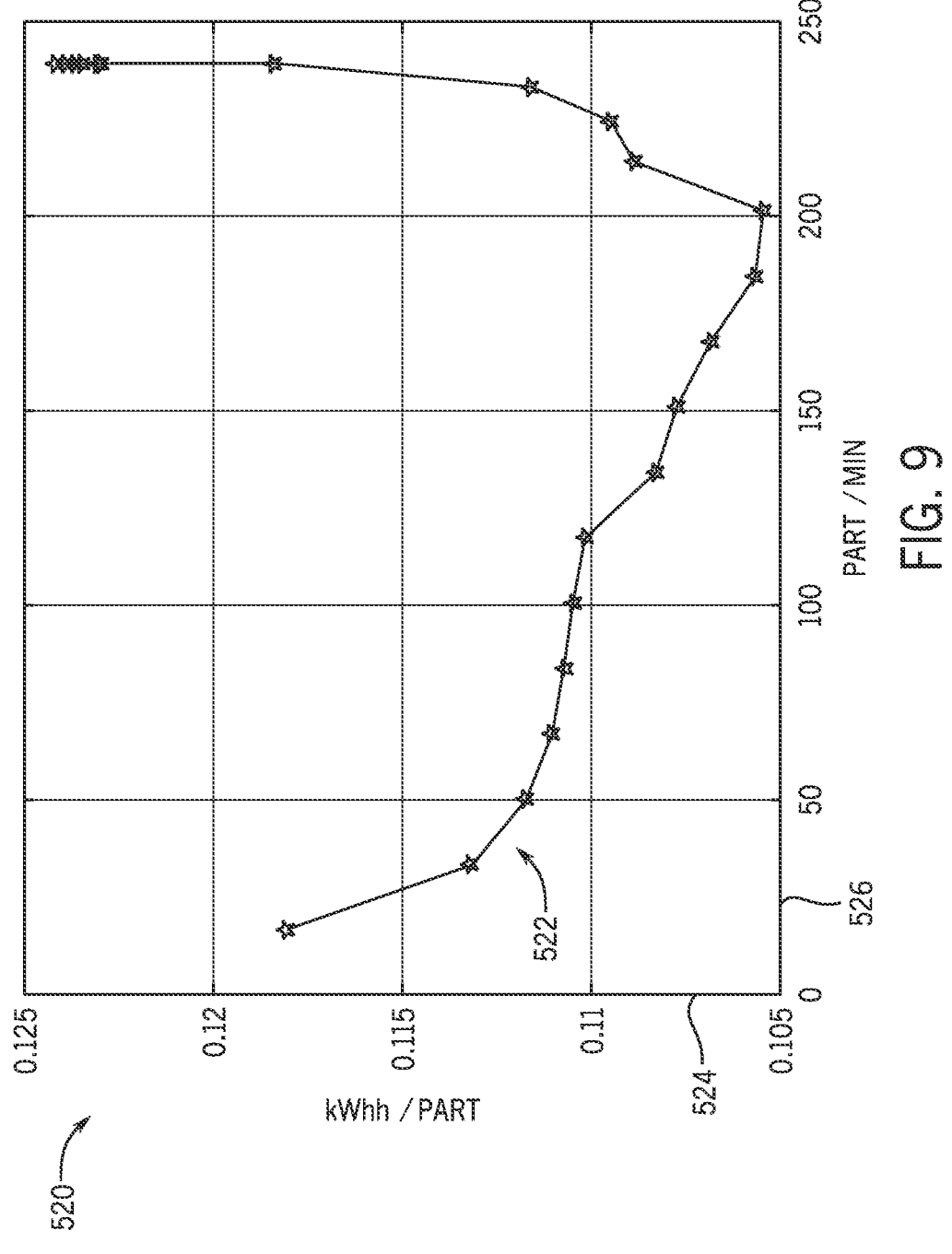
FIG. 9 is a graph indicative of energy consumption versus number of parts produced by a mover system per minute; in accordance with an embodiment.

At process block 458, the computing system 34 may generate one or more graphs based on the determined throughput and energy consumption per unit determined at process block 456. To help provide more context, FIG. 7-9 are examples of graphs that may be generated by the computing system 34 at process block 458. In particular, FIG. 7 is a graph 480 of a line 482 indicative of a number of parts produced by a mover system per minute (as indicated by axis 484) per number of movers in the mover system (as indicated by axis 486). FIG. 8 is a graph 500 of a line 502 indicative of energy consumption (in kilowatt hours per part produced, as indicated by axis 504) per number of movers in the mover system (as indicated by axis 506). FIG. 9 is a graph 520 of a line 522 indicative of energy consumption (in kilowatt hours per part produced, as indicated by axis 524) versus number of parts produced by a mover system per minute (as indicated by axis 526). It should be noted that the energy consumption (e.g., in graph 520) may be specific to a mover system or general the entire production of a unit, including portions of the production of the unit performed without using the mover system. In other words, in one embodiment, the graph 520 may be indicative of electrical power consumed by the mover system (e.g., a portion (specific to the mover system) of a total amount of electrical power consumed to produce one unit) or the total electrical power consumed to produce the unit (e.g., an amount of electrical power consumed by the mover system and other components (e.g., of the industrial automation system 10) outside of the mover system). Moreover, in other embodiments, other graphs may be generated process block 458 in addition to, or in the alternative to, one or more of the graphs 480, 500, 520. Such graphs may relate to environmental impact. For example, other graphs generated at process block 458 may plot greenhouse gas emissions (in total or per unit produced for a specific greenhouse gas (e.g., carbon dioxide), carbon dioxide equivalent ($CO_2e$) (which may be determined by multiplying electrical power by an emission factor) or several greenhouse gases) against the number of movers utilized or the number of units produced per minute.

Furthermore, as the graphs 480, 500, 520 (or any other graphs generated at process block 458) may be generated (partially or wholly) utilizing data generated from operating the mover system (e.g., sensor data, production data, electrical power consumption data, etc.), the graphs 480, 500, 520 may reflect or be indicative of how particular operating variables vary. For example, in the context of the graph 480, the number of parts produced per minute may be determined (and then plotted on the graph 480) by implementing and testing a mover system using different numbers of movers and measuring the throughput. As another example, in context of the graph 500 the amount of electrical energy consumed for a particular number of movers may be determined (and then plotted on the graph 500) by implementing and testing a mover system using different numbers of movers and measuring the electrical power consumed. As yet another example, in the context of the graph 520, the amount of electrical power consumed per part produced may be determined (and then plotted on the graph 500) by implementing and testing a mover system using different numbers of movers and measuring the amount of electrical power used (per part produced) at various throughput or production rates.

Returning to FIG. 6 and the discussion of the process 450, at process block 460, the mover system may be implemented and/or controlled based at least in part on the graph(s) generated at process block 456. In some embodiments, process block 460 may be implemented also based on the data received at process block 452. Process block 460 may also include determining a maximum fleet size (e.g., number of movers) based on the graph(s) (sub-process block 462) and determining one or more minimal energy operating points (sub-process block 464). The maximum fleet size may be equal to or less than the maximum possible fleet size. In some embodiments, the maximum fleet size may be a number of movers (based on the graph(s) (e.g., graph 480)) that corresponds to the highest number of parts produced per minute. The one or more minimal energy operating points may be absolute minima or local minima within the graphs (e.g., graphs 500, 520). As such, a mover system may be implemented (e.g., initialized) having a number of movers equal to or less than the maximum number of movers, and the mover system may be controlled (e.g., by the industrial control system 12). For example, acceleration and velocity parameters (e.g., minimum and maximum acceleration and/or velocity values for movers) may be determined, and the movers may be controlled to operate within such parameters. It should be noted that control of mover systems is discussed in more detail below.

As briefly noted above, mover systems may include one or more "parking lots," which may be portions of a mover system in which movers may be maintained when not being used (e.g., to produce products or units). To help illustrate, FIG. 10 is a schematic drawing of a mover system 550, which may be the mover system 200 that includes a parking lot. In particular, the mover system 550 includes a track 552 that includes a first portion 554 and second portion 556, in which the first portion 554 of the track 552 may be utilized for producing or assembling products or units, while the second portion 556 of the track 552 may a parking lot utilized as a place to maintain movers 210 that are not being utilized to produce or assemble products or units. As illustrated, the second portion 556 of the track 552 may be generally parallel to one or more sections of the first portion 554 of the track 552. As discussed below, the mover system 550 and, more specifically, the movers 210, may be controlled (e.g., by the industrial controller system 12 or a portion thereof) to adjust the number of movers 210 that are utilized in the first portion 554 and the second portion 556 of the track 552. However, before doing so, it should be noted that the first portion 554 may be referred to as a "first track," the second portion 556 may be referred to as a "second track." As such, the parking lot may be implemented by a track that is not used in the production of units (e.g., because the track does not include robots 204 or other machines or devices used in the production of the units or products or because such robots 204, machines, or devices, are not currently being utilized) that is coupled to another track that may be utilized in the production of units or products. Moreover, in other embodiments, the mover system 550 may include more than one parking lot. In other words, the mover system 550 may include several tracks that may be used to park movers 210 that are idle, inactive, or otherwise not used for production. It should also be noted that a third portion 558 of the track 552 may be utilized as a parking lot (e.g., alone or in addition to the second portion 556 of the track). As illustrated, the third portion 558 of the track 552 does not include any robots 204. As such, the third portion 558 of the track 552 may be considered a part of the track 552 that is not utilized for production. Accordingly, a parking lot may be implemented using a portion (e.g., portion 558) of the first track (e.g., portion 554). That is, the parking lot may be implemented on a portion of a track that is not utilized for production, though another portion of the track may be utilized for production.

Figure 11:
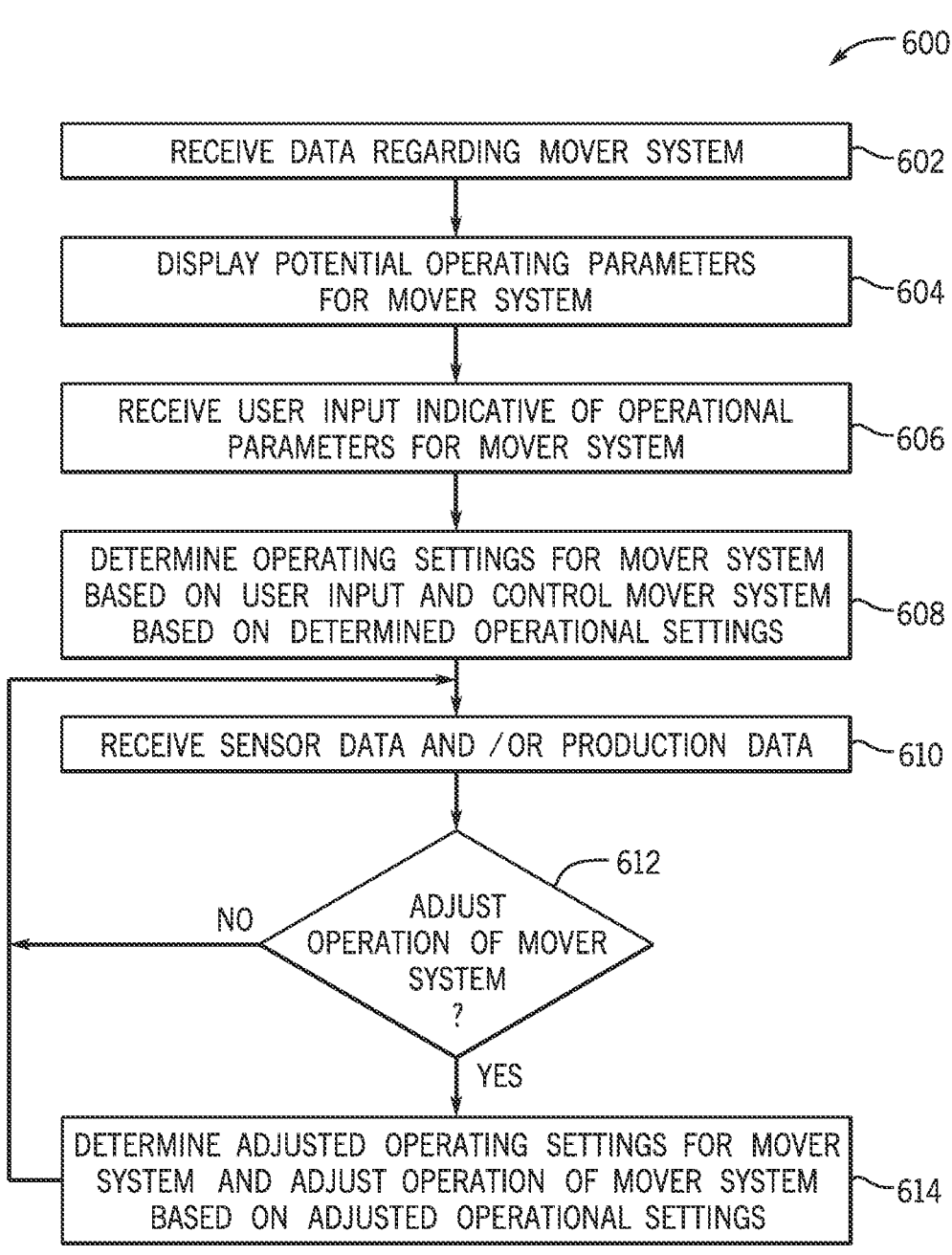
FIG. 11 is a flow diagram of a process for controlling a mover system, in accordance with an embodiment.

Continuing with the drawings, FIG. 11 is a flow diagram of a process 600 for controlling a mover system, such as the mover system 550 or any other mover system, including the mover system 200 discussed below with respect to FIG. 3. The process 600 may be performed by the industrial control system 12 or a computing device or system included in the industrial automation system 10, such as, but not limited to, the computing system 34. The process 600 may be implemented by one or more processors executing computer-readable instructions that may be stored on the non-transitory storage medium. Furthermore, the process 600 may be implemented via processing circuitry that implements one or more containers (e.g., a container utilized by the industrial control system 12 or the container orchestration system 24). As such, while the process 600 is generally described below with reference to the computing system 34, the industrial control system 12, and the mover system 550, it should be noted that the process 600 may be performed by other another device or system. Furthermore, it should be noted that, in some embodiments, operations of the process 600 described below may be omitted or performed in a different order than as discussed below.

At process block 602, computing system 34 or the industrial control system 12 may receive data regarding a mover system, such as the mover system 550. The data received at process block 602 may include, but is not limited to, data discussed above as received at process block 452 of the process 450, throughput and energy consumption values determined at process block 456 of the process 450, one or more graphs generated at process block 458 of the process 450, or any combination thereof. Accordingly, the computing system 34 or the industrial control system 12 may receive data regarding the mover system 550.

At process block 604, the computing system 34 or the industrial control system 12 may cause potential operating parameters for the mover system 550 to be displayed, for example, via a user interface that is presented on an electronic display (e.g., the display 20). The potential operating parameters may be included in the data received at process block 602 or determined based on the data received at process block 602. For example, the potential operating parameters may include costs of energy (e.g., electrical power in megawatts per hour) at different times of the day (or different days), one or more throughputs (e.g., amounts of units to be produced or generated using the mover system), motion parameters associated with movers (e.g., maximum acceleration, maximum velocity, braking characteristics, etc.), a size or sizes of the movers, dwell times for particular stations, settling times, carbon impact associated with electrical energy consumption (e.g., based on energy source being renewable or non-renewable and/or time of day at which energy sources are available), overall environmental impact associated with electrical energy consumption (which may include the carbon impact), or any combination thereof. Thus, the potential operating parameters may include ranges of values for various operational parameters with which the mover system 550 may operate. It should be noted that the graphs 480, 500, 520, may also be displayed at process block 604.

At process block 606, the computing system 34 or the industrial control system 12 may receive a user input indicative of operational parameters for the mover system 550, which may be generally applicable (e.g., used for any time period unless otherwise specified) or specific to a particular period of time. For example, the user may select a minimum and/or maximum value for a throughput of the mover system 550, a minimum and/or maximum amount of power consumed (e.g., per unit produced by the mover system 550), minimum and/or maximum acceleration of movers 210, minimum and/or maximum velocity of movers 210, a minimum and/or maximum number of movers 210 to be utilized, priorities for operating parameters (e.g., to prioritize one operating parameters over another), or any combination thereof.

At process block 608, the computing system 34 or the industrial control system 12 may determine operating settings for the mover system 550 based on the user input received at process block 606. Additionally, the computing system 34 or the industrial control system 12 may control the mover system 550 to operate in accordance with the determined operating settings. In particular, the operating settings may be particular values or ranges of values of the operational parameters discussed above or operating settings that, when utilized, may cause the mover system 550 to operate in accordance with the operational parameters specified by the user input. For example, the computing system 34 or the industrial control system 12 may determine a particular number of movers 210 to be utilized (e.g., a subset of a total number of movers 210 in the mover system 550), whether the movers 210 will be utilized on only the first portion 554 of the track 552 or both the first portion 554 and the second portion 556 of the track 552, a number of movers that will be parked in the second portion 556 of the track 552 (e.g., when only the first portion 554 of the track 552 is to be utilized), whether to power down the second portion 556 of the track 552 and any robots 204, machines, or devices utilized in conjunction with the second portion 556 of the track 552, one or more modes of operation of the mover system 550 (e.g., a first mode in which both the first portion 554 and the second portion 556 of the track are utilized and a second mode in which only the first portion 554 is utilized), one or more accelerations and/or velocities for the movers at one or more segments of the track 552, or any combination thereof. To determine the operating settings, the industrial control system 12 or the computing system 34 may perform simulations (e.g., using one or more digital twins) as discussed above, and/or utilize previously collected data such as sensor data and/or production data (e.g., data indicative of throughput, power consumption, power costs). As such, the industrial control system 12 or the computing system 34 may determine settings with which the mover system 550 is to operate and cause the mover system 550 to operate in accordance with the determined operating settings.

At process block 610, the computing system 34 or the industrial control system 12 may receive sensor data (e.g., from sensors 18, 304, 318) and/or production data (e.g., data indicative of throughput, power consumption, power costs). In some embodiments, the computing system 34 or the industrial control system 12 may determine the production data (e.g., based partially on received sensor data).

At decision block 612, the computing system 34 or the industrial control system 12 may determine whether to adjust operation of the mover system 550. In particular, the computing system 34 or the industrial control system 12 may determine to adjust operation of the mover system 550 in response to a newly received user input indicative of other operational parameters of the mover system 550 and/or in response to determining that the mover system 550 is not operating in accordance with either the operational parameters indicated by the user input received at process block 606 or the operating settings determined at process block 608. For example, if the computing system 34 or the industrial control 12 were to determine that an actual throughput of the mover system 550 were outside of a range of throughput values (e.g., as indicated by the user input received at process block 606, the computing system 34 or the industrial control 12 may determine to adjust operation of the mover system 550, for example, so that the mover system 550 operates as desired by a user (as indicated by the user's input received at process block 606 or a newly received user input). Upon determining that the operation of the mover system 550 is not to be adjusted, the process 600 may return to process block 610, and additional sensor data and/or production data may be received.

However, if at decision block 612 the computing system 34 or the industrial control system 12 determines that operation of the mover system 550 is to be adjusted, at process block 614, the computing system 34 or the industrial control system 12 may determine operational settings for the mover system 550 (e.g., based on the received sensor data and/or production data) and cause operation of the mover system 550 to be adjusted, for example, based on the (newly) determined operational settings. For example, to continue with the example in which actual throughput of the mover system 550 is not within a range of throughputs (e.g., a range of target throughputs) indicated by a received user input, the industrial control system 12 or the computing system 34 may determine a new acceleration and/or velocity for the movers 210, to increase or decrease the amount of movers 210 that are "parked" (e.g., not used for production), utilize the second portion 556 or stop utilizing the second portion 556 of the track 552, or another suitable action that may cause the throughput of the mover system 550 to change. Similar to process block 608, the determined operational settings may be determined based, at least in part, on simulations of the mover system 550. After determining the operational settings, the computing system 34 or the industrial control system 12 may cause the mover system 550 to operate in accordance with the determined operational settings. In other words, the computing system 34 or the industrial control system 12 may cause the operation of the mover system 550 to be modified.

By using the disclosed techniques, mover systems may be designed, implemented, and controlled to enable production within desired operating parameters. Furthermore, the inclusion of a parking lot within a mover system may enable a mover system to dynamically adjust the number of movers utilized for production, thereby enabling the mover system to increase or decrease production (e.g., in accordance with the desired operating parameters). Accordingly, use of the disclosed techniques may cause an industrial automation system to run more efficiently and increase production.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mover system comprising:
a track;
a plurality of movers configured to move along the track; and
one or more processors configured to:
　　receive a user input indicative of one or more operational parameters for the mover system;
　　determine a maximum fleet size for the mover system based on the one or more operational parameters, wherein the maximum fleet size corresponds to a first number of movers available for the mover system;
　　determine a throughput per mover value, an energy consumption per mover value, or both associated with each fleet size up to the maximum fleet size based on an expected operation of the mover system;
　　determine one or more operating settings for the mover system based on the throughput per mover value, the energy consumption per mover value, or both for each fleet size, wherein the one or more operating settings comprise an additional number of movers; and
　　cause a portion of the plurality of movers to operate in accordance with the one or more operating settings, wherein the portion of the plurality of movers corresponds to the additional number of movers.

2. The mover system of claim 1, wherein:
the track comprises a first portion and a second portion; and
the one or more operating settings comprise a numerical value of an amount of movers of the plurality of movers that are to be parked in the second portion of the track.

3. The mover system of claim 2, wherein the one or more operating settings comprise an indication that the second portion of the track or one or more industrial automation components associated with the second portion of the track are to be powered down.

4. The mover system of claim 1, wherein the one or more processors are configured to determine the one or more operating settings for the mover system based on one or more simulations of the mover system associated with the throughput per mover value, the energy consumption per mover value, or both for each fleet size.

5. The mover system of claim 1, wherein the one or more processors are configured to:

receive sensor data associated with the mover system from one or more sensors of the mover system, production data associated with the mover system, or both;

determine whether to modify an operation of the mover system based on the sensor data, the production data, or both; and in response to determining to modify the operation of the mover system:

determine one or more modified operating settings for the mover system based on the sensor data, the production data, or both; and cause the plurality of movers to operate in accordance with the one or more modified operating settings.

6. The mover system of claim 5, wherein the one or more processors are configured to cause the plurality of movers to operate in accordance with the one or more modified operating settings by causing one or more movers of the plurality of movers to change from being parked to being utilized for production.

7. The mover system of claim 5, wherein the one or more processors are configured to determine whether to modify the operation of the mover system by determining whether the mover system is operating in accordance with the one or more operational parameters.

8. The mover system of claim 1, wherein the one or more processors are configured to cause an electronic display to display one or more potential operational parameters for the mover system, wherein the one or more operational parameters comprise one or more values within the one or more potential operational parameters.

9. The mover system of claim 1, wherein the one or more processors are configured to determine the operating settings by:

determining a minimum amount of energy per unit produced by the mover system;

determine a minimum number of movers of the plurality of movers to maximize an amount of units produced by the mover system; or both.

10. The mover system of claim 1, wherein the one or more processors are configured to determine the maximum fleet size based on a track layout, a length of track, or both.

11. A non-transitory computer-readable medium comprising instructions that, when executed by one or more processors, cause the one or more processors to:

receive a user input indicative of one or more operational parameters for a mover system, wherein the mover system comprises a track and a plurality of movers configured to move along the track, wherein the one or more operational parameters comprise a minimum throughput of the mover system, a maximum throughput of the mover system, a maximum amount of electrical power per unit produced at least partially by the mover system, a maximum cost for electrical power per unit produced at least partially by the mover system, a number of movers of the plurality of movers to be used, or any combination thereof;

determine a maximum fleet size for the mover system based on the one or more operational parameters, wherein the maximum fleet size corresponds to a first number of movers of the plurality of movers available for the mover system;

determine a throughput per mover value, an energy consumption per mover value, or both associated with each fleet size up to the maximum fleet size based on an expected operation of the mover system;

determine one or more operating settings for the mover system based on the throughput per mover value, the energy consumption per mover value, or both for each fleet size, wherein the one or more operating settings comprise an additional number of movers; and cause a portion of the plurality of movers to operate in accordance with the one or more operating settings, wherein the portion of the plurality of movers corresponds to the additional number of movers.

12. The non-transitory computer-readable medium of claim 11, wherein the one or more operating settings comprise:

a first number of movers of the plurality of movers to be utilized to produce units; and a second number of movers of the plurality of movers to be stationary and not used to produce the units.

13. The non-transitory computer-readable medium of claim 11, wherein the instructions, when executed, cause the one or more processors to determine the one or more operating settings based on:

one or more amounts of electrical power per unit produced for different numbers of movers of the plurality of movers;

one or more throughput values for the different numbers of movers of the plurality of movers;

an expected cost of the electrical power for the mover system; or a combination thereof.

14. The non-transitory computer-readable medium of claim 13, wherein the one or more amounts of electrical power per unit and the one or more throughput values comprise previously measured values obtained from operating the mover system.

15. The non-transitory computer-readable medium of claim 11, wherein the instructions are included in a container image or executed by implementing a container.

16. A controller comprising one or more processors configured to:

receive a user input indicative of one or more operational parameters for a mover system, wherein the mover system comprises a track and a plurality of movers configured to move along the track, wherein the one or more operational parameters comprise at least two of a minimum throughput of the mover system, a maximum throughput of the mover system, a maximum amount of electrical power per unit produced at least partially by the mover system, a maximum cost for electrical power per unit produced at least partially by the mover system, and a number of movers of the plurality of movers to be used;

determine a maximum fleet size for the mover system based on the one or more operational parameters wherein the maximum fleet size corresponds to a first number of movers available for the mover system;

determine a throughput per mover value, an energy consumption per mover value, or both associated with each fleet size up to the maximum fleet size based on an expected operation of the mover system;

determine one or more operating settings for the mover system based on the throughput per mover value, the energy consumption per mover value, or both for each fleet size, wherein the one or more operating settings comprise an additional number of movers; and cause a portion of the plurality of movers to operate in accordance with the one or more operating settings, wherein the portion of the plurality of movers corresponds to the additional number of movers.

17. The controller of claim 16, wherein the one or more processors are configured to cause the plurality of movers to operate in accordance with the one or more operating settings by causing:

a first portion of the plurality of movers to be parked in an idle state on a first portion of the track; and a second portion of the plurality of movers to be used in a second portion of the track for production.

18. The controller of claim 17, wherein the one or more operating settings comprise:

an acceleration for the second portion of the plurality of movers;

a velocity for the second portion of the plurality of movers; or both.

19. The controller of claim 17, wherein the one or more processors are configured to determine the one or more operating settings based at least in part on one or more settling times associated with one or more stations of the mover system.

20. The controller of claim 17, wherein the one or more processors are configured to:

receive sensor data associated with the mover system from one or more sensors of the mover system, production data associated with the mover system, or both; and in response to receiving the sensor data, the production data, or both, cause the first portion of the plurality of movers to be moved to the second portion of the track to be used for production.

* * * * *